(12) United States Patent
Rea (10) Patent No.: US 9,431,135 B2
(45) Date of Patent: Aug. 30, 2016

(54) NUCLEAR REACTOR FLUENCE REDUCTION SYSTEMS AND METHODS

(71) Applicant: Global Nuclear Fuel—Americas, LLC, Wilmington, NC (US)

(72) Inventor: John P. Rea, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 38 days.

(21) Appl. No.: 14/109,461

(22) Filed: Dec. 17, 2013

(65) Prior Publication Data

US 2015/0170768 A1    Jun. 18, 2015

(51) Int. Cl.
G21C 7/06    (2006.01)
G21C 7/24    (2006.01)
G21C 3/326    (2006.01)
G21C 5/02    (2006.01)
G21C 11/02    (2006.01)

(52) U.S. Cl.
CPC ............... *G21C 7/06* (2013.01); *G21C 3/326* (2013.01); *G21C 5/02* (2013.01); *G21C 7/24* (2013.01); *G21C 11/022* (2013.01); *G21C 11/024* (2013.01); *Y02E 30/38* (2013.01)

(58) Field of Classification Search
CPC ............ G21C 3/00; G21C 3/22; G21C 3/06; G21C 3/28; G21C 3/18; G21C 3/324
See application file for complete search history.

(56) References Cited

U.S. PATENT DOCUMENTS 4,743,423 A    5/1988    Turner et al.
4,759,896 A *    7/1988    Boyd .......................... 376/224
8,064,564 B2    11/2011    Singleton
8,126,105 B2    2/2012    Yokoyama et al.
8,615,065 B2    12/2013    Balog
2002/0106049 A1    8/2002    Schulz
2007/0133731 A1    6/2007    Fawcett et al.
2009/0122946 A1    5/2009    Fawcett et al.
2009/0135988 A1    5/2009    Russell, II et al.

(Continued)

FOREIGN PATENT DOCUMENTS

JP    06201876    7/1995
WO    9600966    1/1996

OTHER PUBLICATIONS

European Patent Office, Search Report in Corresponding EPO Application 14198231.4-1556, May 11, 2015.

(Continued)

*Primary Examiner* — Jack W Keith
*Assistant Examiner* — Lily C Garner
(74) *Attorney, Agent, or Firm* — Ryan Alley Intellectual Property Law (57) ABSTRACT

Nuclear fuel assemblies include at least one fluence control structure for use in a nuclear reactor core with other nuclear fuel assemblies. Such flux-limiting assemblies and structures may be positioned outside of or around the other nuclear fuel assemblies in the core so as to reduce neutron flux beyond the fluence controlled nuclear fuel assemblies, and fluence control structures may be positioned at an outside edge of the core. Fluence control structures limit neutron flux with non-fuel materials in structures like fuel rods and inserts, channels, shield curtains, etc. at particular positions in fuel assemblies. An engineer may select and/or install fluence-limiting fuel assemblies with flux-limiting characteristics in cores having neutronics profiles expected to benefit from such flux limitation.

10 Claims, 5 Drawing Sheets

(56) References Cited

U.S. PATENT DOCUMENTS

2009/0135990 A1    5/2009  Poon et al.
2010/0266095 A1*  10/2010  Russell et al. ................ 376/419
2013/0077725 A1    3/2013  Bloomquist et al.

OTHER PUBLICATIONS

Mexican Office Action in corresponding Mexican application MX/a/2014/0015421, Mar. 8, 2016.

* cited by examiner

NUCLEAR REACTOR FLUENCE REDUCTION SYSTEMS AND METHODS

BACKGROUND

Figure 1:
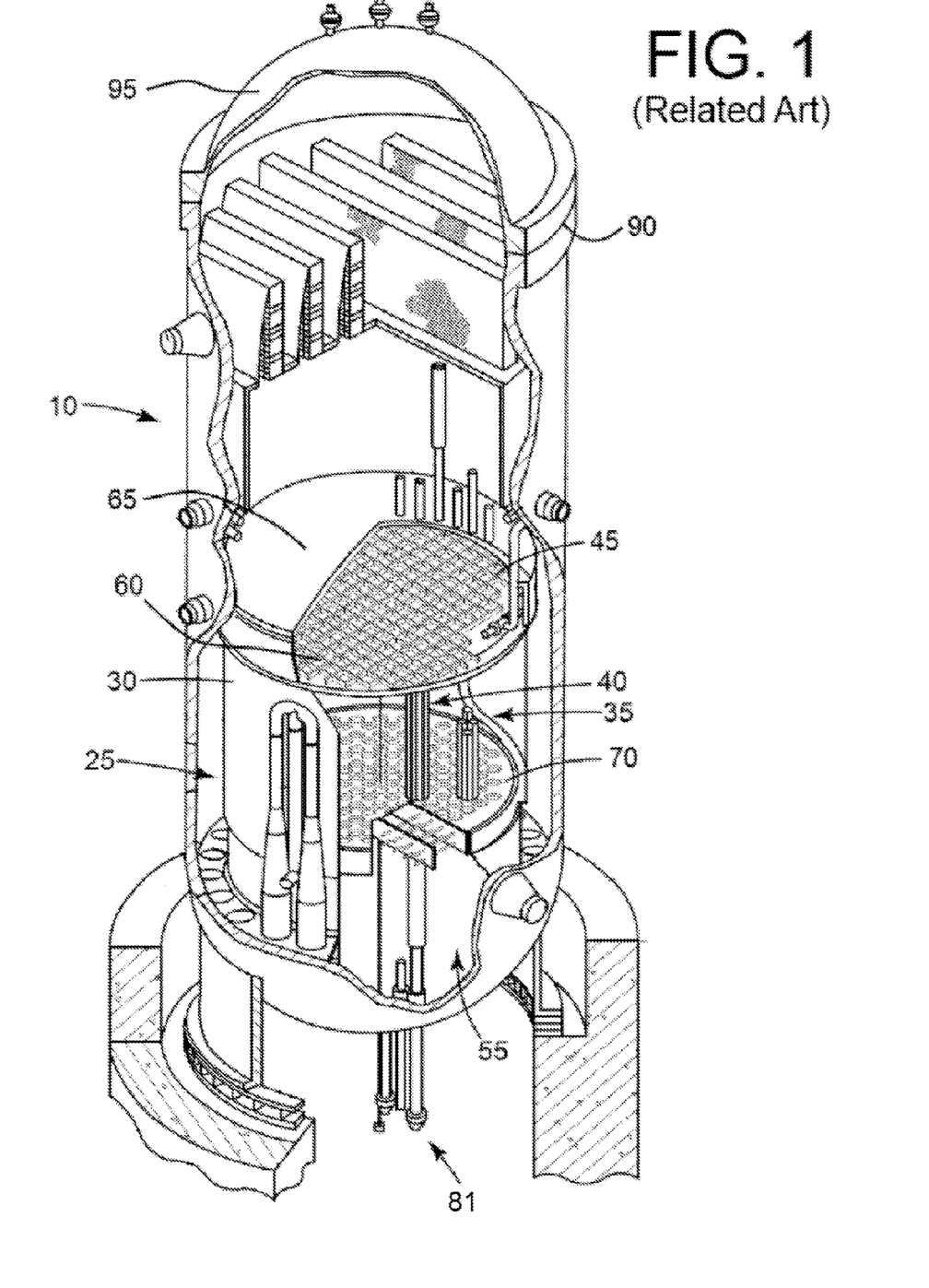
FIG. 1 is an illustration of a related art nuclear power vessel and internals.

As shown in FIG. 1, a nuclear power station conventionally includes a reactor pressure vessel 10 with various configurations of fuel and reactor internals for producing nuclear power. For example, vessel 10 may include a core shroud 30 surrounding a nuclear fuel core 35 that houses fuel structures, such as fuel assemblies, 40. A top guide 45 and a fuel support 70 may support each fuel assembly 40. An annular downcorner region 25 may be formed between core shroud 30 and vessel 10, through which fluid coolant and moderator flows into the core lower plenum 55. For example, in US Light Water Reactor types, the fluid may be purified water, while in natural uranium type reactors, the fluid may be purified heavy water. In gas-cooled reactors, the fluid coolant may be a gas such as helium, with moderation provided by other structures. The fluid may flow upward from core lower plenum 55 through core 35. After being heated in core 35, the energetic fluid may enter core upper plenum 60 under shroud head 65.

One or more control rod drives 81 may be positioned below vessel 10 and connect to control rod blades 80 (FIG. 2) that extend among fuel assemblies 40 within core 35. Vessel 10 may be sealed and opened through upper head 95 at flange 90. With access to the reactor internals, some of fuel bundle assemblies 40 are replaced and/or moved within core 35, and maintenance / installation on other internal structures and external structures, including shroud 30 and reactor pressure vessel 10 itself may be performed inside and outside reactor 10.

Figure 2:
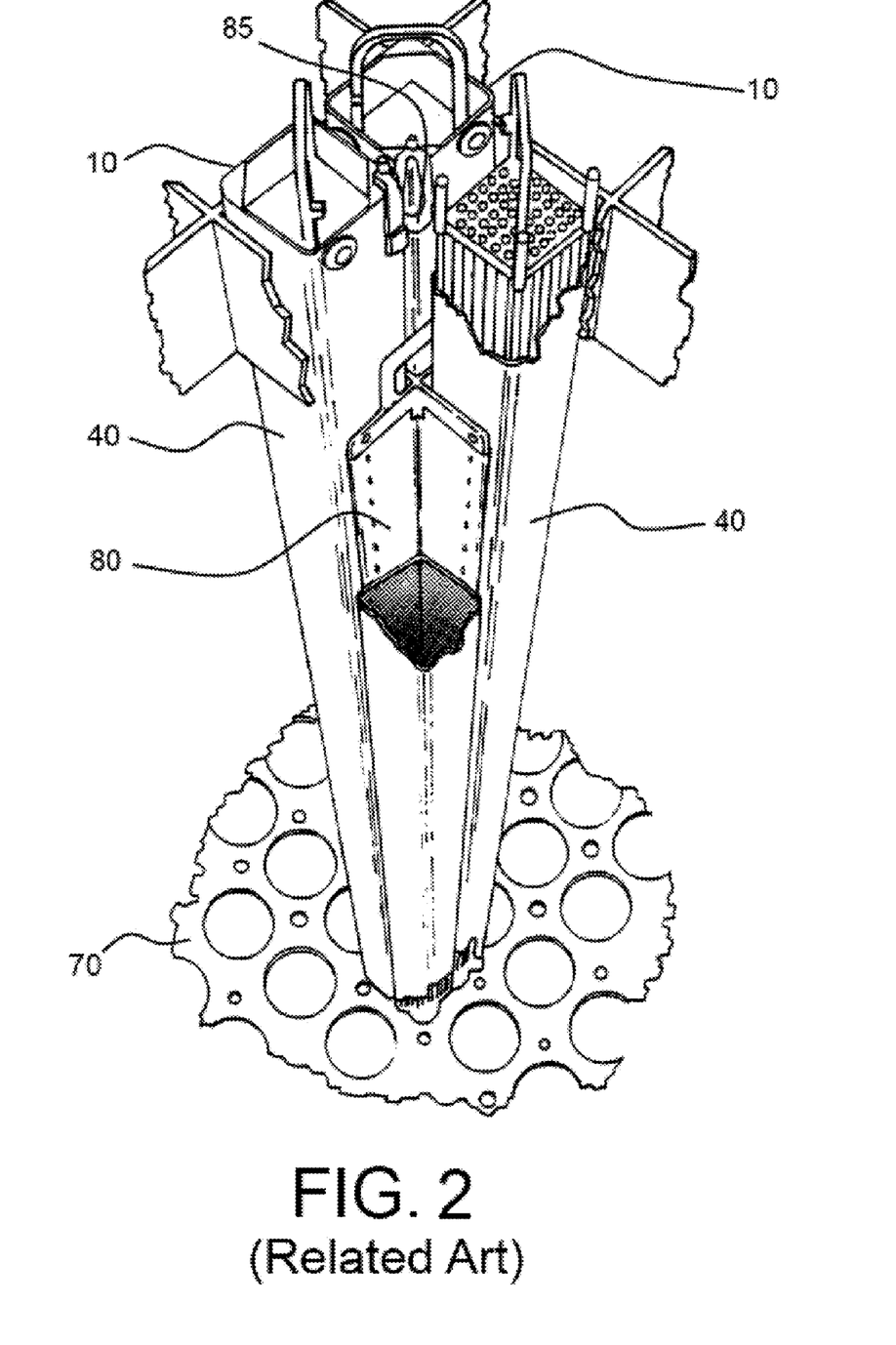
FIG. 2 is an illustration of a controlled group of related art fuel assemblies in use with a control rod blade.

FIG. 2 is an illustration of a portion of fuel core 35 from FIG. 1 showing several fuel assemblies 40 positioned about a control blade 80. During operation, control rod drive 81 maneuvers control rod blade 80 to a desired axial position among fuel assemblies 40 to obtain a desired power density. Control rod blade 80 typically has a cross or cruciform traverse cross-section; however, rods and other shapes are known control elements useable in nuclear reactors. Control rod blade 80 includes a material that absorbs neutrons of a desired spectrum, such as boron, cadmium, etc., so as to reduce neutron fluence among assemblies 40 and thus control the nuclear chain reaction. In FIG. 2, fuel bundle assemblies 40 surround the control rod blade 80, which is positioned in a central intersection surrounded by the four fuel bundle assemblies 40 in order to maximize exposure to, and thus control, fuel assemblies 40 together.

Figure 3:
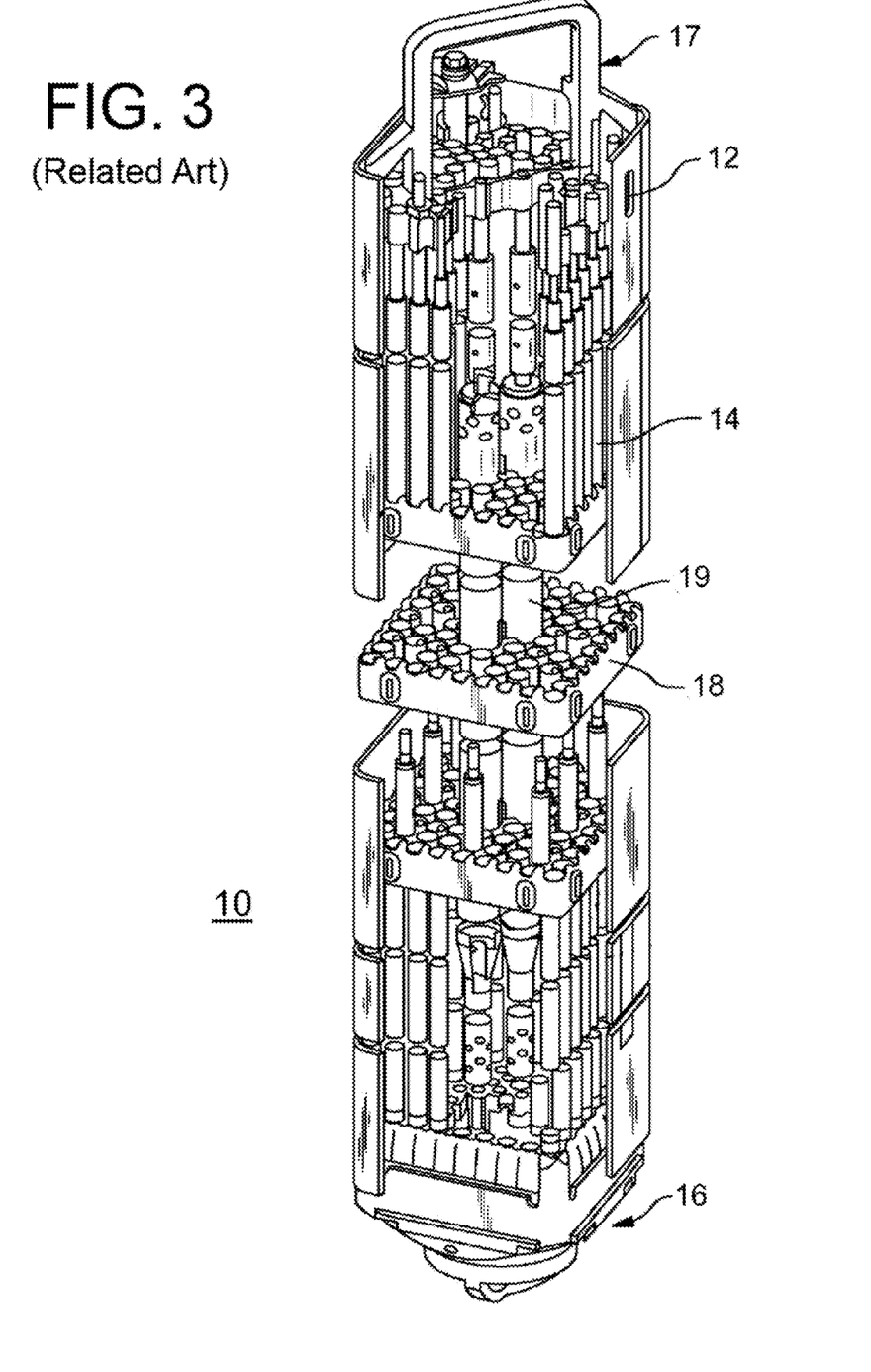
FIG. 3 is an illustration of a related art fuel assembly.

FIG. 3 is an illustration of a related art fuel assembly 40, such as assemblies 40 shown in FIGS. 2 and 3. As shown in FIG. 3, fuel assembly 40 includes multiple fuel rods 14 filled with fissile material for power generation. Fuel rods 14 are arranged in a uniform grid laterally and extend in the axial direction continuously throughout assembly 40. Fuel rods 14 are seated into a lower tie plate 16 and extend upward into an upper tie plate 17 at ends of fuel assembly 40. Fuel rods 14 are bounded by a channel 12 that forms an exterior of the assembly 40, maintaining fluid flow within assembly 40 throughout the axial length of assembly 40. Conventional fuel assembly 40 also includes one or more fuel spacers 18 at various axial positions to align and space fuel rods 14. One or more water rods 19 may also be present to provide a desired level of moderator or coolant through-flow to assembly 40.

SUMMARY

Example embodiments include nuclear fuel cores and surrounding structures, fuel assemblies for use in the same, and fluence control structures for use in the same. Example cores include nuclear fuel assemblies in combination with a fuel assembly/ies having a fluence control structure(s). Fluence-limiting assemblies and structures may be positioned outside of or around the other nuclear fuel assemblies in the core so as to reduce neutron flux beyond the fluence controlled nuclear fuel assemblies. The fluence control structure may itself be positioned at an outside edge of the core so that fluence control exists only beyond the nuclear fuel assemblies and fluence-limiting assemblies. Fluence control structures limit neutron flux at particular positions through the use of appropriate material, dimensioning, and placement in fuel assemblies. In example methods, core engineers may select and/or install fluence-limiting fuel assemblies with flux-limiting characteristics in cores having neutronics profiles expected to benefit from such flux limitation.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between"

versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The inventor has recognized problems arising from nuclear power operations where neutron flux over time, or fluence, causes component brittling and/or failure. This problem may have particular consequences on especially flux-sensitive, or large, non-replaceable nuclear components such as a core shroud 30 (FIG. 1) or reactor pressure vessel 10 (FIG. 1). The inventor has further discovered that installation of a separate reflector/absorber structure inside of a reactor or use of smaller cores with water perimeters create additional problems. A separate reflector/absorber structure requires its own separate installation and maintenance and may not fit between a core and a shroud without interfering with hydrodynamics. Smaller cores generate less power and can have sharper radial flux profiles, which can near or exceed safety margins for power ratios of fuel assemblies. The below disclosure uniquely overcomes these and other problems recognized by the inventor in nuclear reactor operations.

The present invention is nuclear fuel-based fluence control. Example embodiments discussed below illustrate just a subset of the variety of different configurations that can be used as and/or in connection with the present invention.

Figure 4:
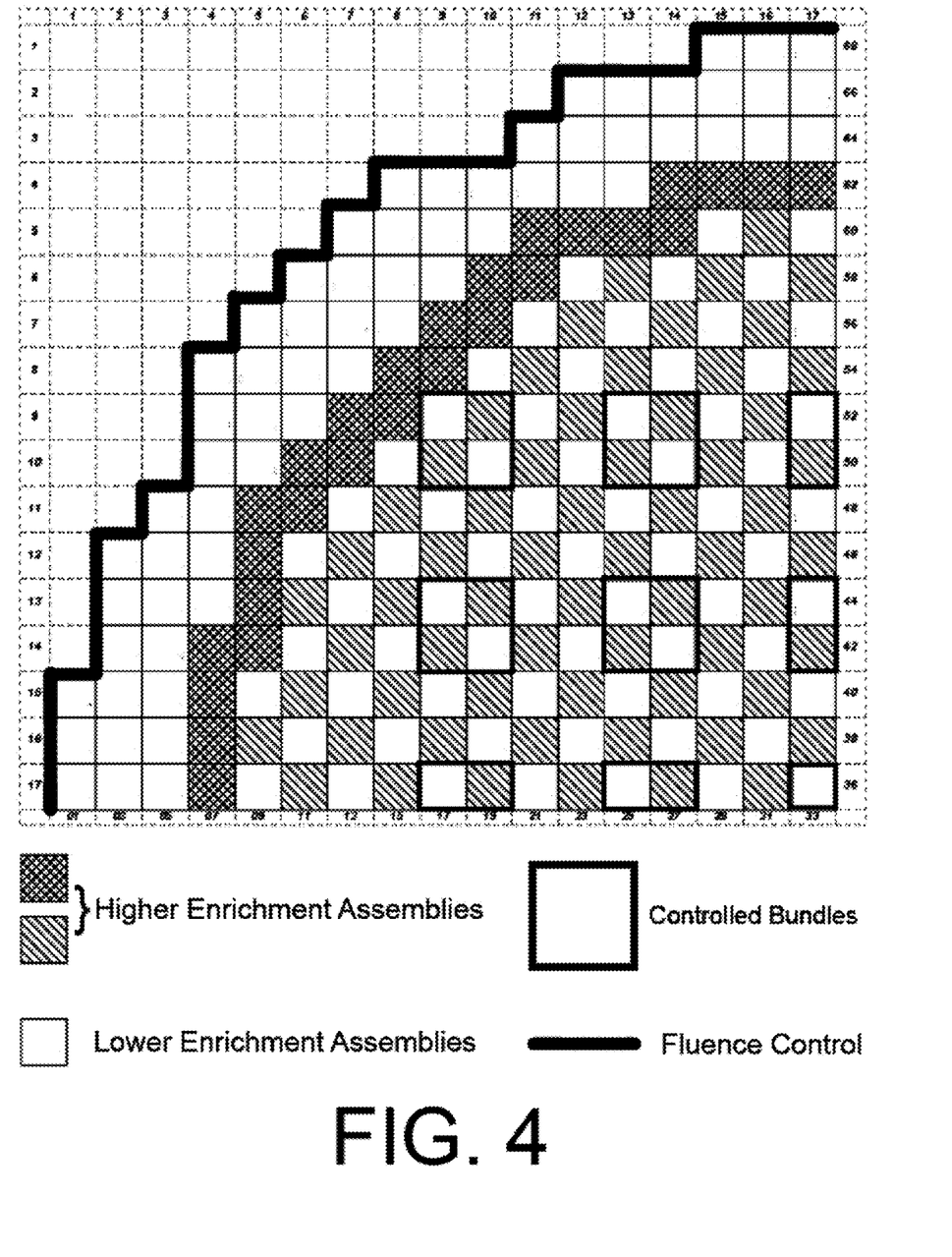
FIG. 4 is an illustration of an example embodiment nuclear core.

FIG. 4 is a quadrant map of an example embodiment reactor core having example embodiment peripheral fuel assembly fluence control structures. In FIG. 4, each square represents a fuel assembly location within one quarter of the core. Reactor cores can be symmetrical about at least two perpendicular axes, such that a quadrant map like FIG. 4 can convey a makeup of the entire core. Although FIG. 4 illustrates a 17×17 quadrant found in some Boiling Water Reactor designs, other core sizes and shapes are useable with example embodiments.

As shown in FIG. 4, locations may be filled (solid outline) and empty (dashed outline) to create a core and perimeter beyond which a shroud and/or reactor vessel (e.g., shroud 30 and/or vessel 10 from FIG. 1) may bound the core. Occupied assembly locations may accommodate higher (diagonal or cross-hatched fill) or lower (shown with no fill) reactivity fuel bundles during any fuel cycle. Varying reactivity can be achieved through varying initial fuel enrichments, using fuel assemblies of different exposures, adjusting fission poisons, etc. For example, the ring of lower enrichment assemblies about an outer perimeter shown in FIG. 4 may be lower enrichment assemblies using natural uranium or once-burnt assemblies, and higher enrichment bundles in an interior portion of the core may use enriched uranium or fresher bundles. Other reactivity patterns, including cores with uniform reactivity, are useable as example embodiment cores.

Control elements, such as control rod blades 80 (FIG. 2), are positioned throughout an interior of the core. A subset of such control elements may be used during operation to control power in the core, and assemblies adjacent to control elements regularly moved to adjust reactivity are shown as controlled bundles in FIG. 4, outlined in heavier squares containing four assembly locations. For example, as shown in FIG. 2, assemblies 10 positioned about a control blade 80 may be represented as controlled assemblies in FIG. 4. Although not shown in FIG. 4, other control elements and controlled assembly groups may be used with example embodiments, including control elements and controlled assemblies closer to a core periphery. As such, it is understood that the shape, size, assembly pattern, control element pattern, and assembly reactivity levels of the example embodiment core may be varied across known and future designs, based on requirements for power generation, safety margins, reactor type, etc.

As shown in FIG. 4, fuel assembly fluence control structures are used in fuel assemblies about an outermost perimeter of the example embodiment fuel core. Fluence control structures are shown by heaviest outlining in FIG. 4. Example embodiment fluence control structures do not generate flux but have a substantial absorptive and/or reflective effect on neutron flux for the spectra encountered at a periphery of a fuel assembly. For example, fluence control structures may include materials having absorption cross sections of one barn or more for thermal and fast neutrons. In this way, fluence control structures limit neutron flux—and thus fluence over time—beyond the core.

As shown in FIG. 4, fuel assembly fluence control structures may be used on one or more outside edges of peripheral fuel assemblies such that fluence control may be continuous on and exclusive to the core periphery, creating a flux boundary at an entire outer perimeter of the core. This may reduce fluence to a core shroud, reactor pressure vessel, and/or other reactor internals surrounding the core.

Fluence control structures may extend axially completely through the core or at selected elevations. Similarly, fuel assembly fluence control structures may be selectively used on less than all peripheral fuel assembly surfaces to create broken peripheral positions that shield only particular locations. For example, only corner assemblies, such as the assembly at position 12-2 in FIG. 4, having two exposed surfaces may use fuel assembly fluence control structures, while assemblies with less exposure lack such structures, or fuel assembly fluence control structures may be used only at locations with significant fluence impact on vulnerable components. Fluence control structures may further be used at internal positions within the periphery for assembly manufacturing simplicity, flux shaping, and/or shielding of components internal to the core, for example.

Example embodiment fuel assembly fluence control structures may be components of fuel assemblies or otherwise directly attached in example embodiment fuel assemblies. In this way, fluence control may be positioned based on fuel assembly positioning. As shown in FIG. 4, by selectively placing and orienting fuel assemblies with one or two faces of example embodiment fluence control structures with a shared axial positioning, a continuous perimeter of fluence control can be formed about a core exterior perimeter across the entire core elevation or at specific axial sections. By installing fluence control structures in individual fuel assemblies, fluence control positions may be created, altered, and/or removed by moving or reorienting fuel assemblies appropriately, without the need for additional installation in or near a reactor core.

Example embodiment fuel assembly fluence control structures may have a variety of forms and characteristics. For example, fluence control structures may be positioned at a variety of locations about core structures and fuel assemblies to provide shielding at desired locations. Similarly, fluence control structures may be fabricated of a variety of flux-limiting materials to provide a desired amount of shielding where placed. Multiple different fluence control structures are useable together in any combination and at any position based on neutronics characteristics in the core and desired fluence limitation.

Figure 5:
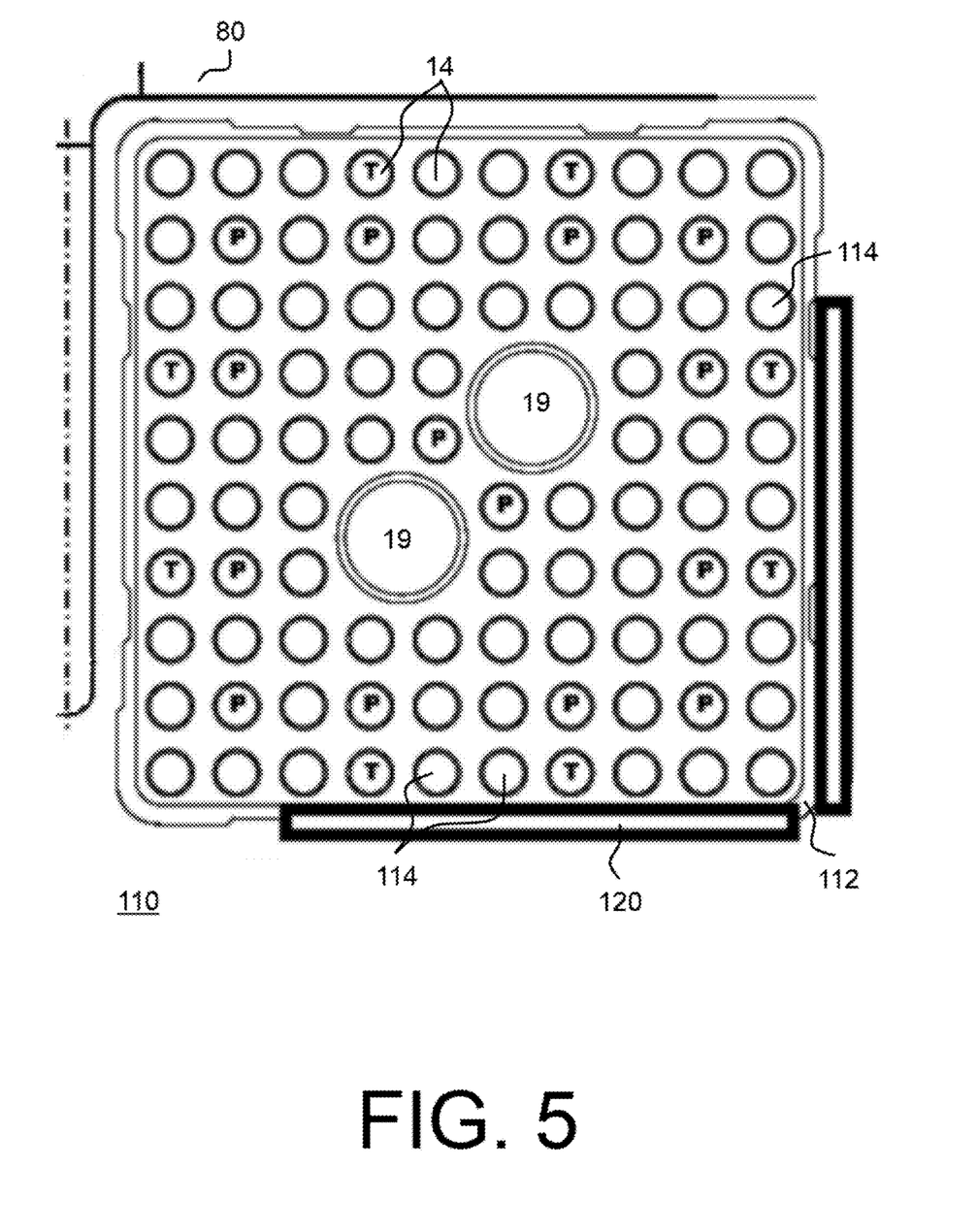
FIG. 5 is an illustration of an example embodiment fuel assembly.

FIG. 5 is an illustration of an example embodiment fluence control structure in use with an example embodiment fuel assembly 110. Although FIG. 5 illustrates multiple different example embodiment fluence control structures, it is understood that any individual aspect of FIG. 5 can be used alone or in any combination. Example embodiment fuel assembly 110 may be very similarly configured to, and used interchangeably with, conventional fuel assemblies, such as fuel assembly 10 in FIGS. 1-3. Use of example embodiment fluence control structure(s) in example embodiment assemblies does not necessarily reduce or destroy compatibility with a variety of different reactor types. For example, as shown in FIG. 5, example embodiment fuel assembly 110 may be used in a position adjacent to a control blade 80 and house conventional elements like fuel rods 14, both full ("T") and part-length ("P"), and water rods 19, just as, and in place of, a conventional BWR fuel assembly.

Example embodiment fuel assembly 110 includes plate curtain 120 as a fluence control structure. Plate curtain 120 may be on an interior or exterior of channel 112, attached by welding, bolting, formed as an integral piece with channel 112, and/or with any other joining mechanism. For example, two plate curtains 120 may be placed on either the outside or inside of the outermost faces of channel 112 exposed to a core shroud or reactor pressure vessel, if fuel assembly 110 is a corner assembly such as position 6-6 in FIG. 4. Plate curtain 120 can extend completely or substantially about an interior or exterior face of assembly 110, or plate curtain 110 may cover only a lateral or axial portion of a channel face in assembly 110. The placement and size of plate curtain 120 may be selected based on its flux reducing properties and position within a core. For example, neutron flux at a particular core position may be projected to be especially high except at lower axial positions, and plate curtain 120 may extend only about channel 112 to cover the upper axial portions.

Plate curtain 120 is fabricated of a material and thickness having a desired neutron flux reduction characteristic. For example, plate curtain 120 may be stainless steel, having a higher neutron absorption cross section at reactor energies, or zirconium, having a lower neutron absorption cross section. For an even stronger effect, plate curtain 120 may be fabricated similarly as an arm of a cruciform control blade 80 and contain a stronger neutron absorber like hafnium, boron, gadolinium, cadmium, etc.

Plate curtain 120 may be of any thickness that does not interfere with other core structures, including about 65-200 mil (thousands of an inch). Similarly to determining position and coverage for plate curtain 120, material and thickness of plate curtain 120 can be selected based on expected neutronics and flux reduction. For example, if lower enrichment bundles are used about a periphery of a core as shown in FIG. 4, plate curtains 120 may be thinner and use a lower absorption material like a zirconium alloy. In other situations with higher thermal and/or fast fluxes, a control-blade style plate curtain 120 may be used. As such, plate curtains 120 of appropriate material and thickness will absorb and/or reflect neutron flux from a perimeter of a core and prevent or reduce fluence over time to structures outside of plate curtains 120, such as a core shroud or reactor vessel, in example embodiment assembly 110.

Example embodiment fuel assembly 110 includes a shielding channel 112 as a fluence control structure. Shielding channel 112 may be identical to a conventional channel 12 (FIGS. 1-3) in shape and size. Of course, in other fuel designs, shielding channel 112 may take on other shapes, sizes, alignments, and connection points in order to preserve such compatibility across several other types of fuel and reactors. Shielding channel 112 may be fabricated of a material with a higher or desired absorption and/or scattering cross section for neutron fluxes expected to be encountered at a position of example embodiment fuel assembly 110. For example, shielding channel 112 may be fabricated from stainless steel instead of a zirconium alloy, or shielding channel 112 may be doped with materials like boron and hafnium that limit neutron flux. Shielding channel 112 may be fabricated in a composite fashion with only select sides/edges having a neutron-flux-reducing material, or shielding channel 112 may be fabricated of a uniform material.

Shielding channel 112 may have a lower effect on reducing neutron flux in example embodiment assembly 110, due to the relative thinness of shielding channel 112. Thus, even if fabricated of a uniform material for manufacturing simplicity, shielding channel 112 will not have a substantially detrimental effect on flux inside of a core, where flux is desired. Shielding channel 112 fabricated with appropriate neutron absorber or reflector will also reduce neutron flux from a perimeter of a core and prevent or reduce fluence over time to structures outside of example embodiment fuel assembly 110, such as a core shroud or reactor vessel, when used in assemblies near such structures.

Example embodiment fuel assembly 110 includes a shielding fuel rod 114 as a fluence control structure. As shown in FIG. 5, shielding fuel rods 114 may occupy an outer row and/or column closest to an edge of a core if example embodiment fuel assembly 110 is placed at a corner or outer position. An entire outer row and outer column in assembly 110 may be made up of only shielding fuel rods 114, or shielding fuel rods 114 may be placed at intervals or in other patterns or positions throughout assembly 110 that limit flux in a desired way. Shielding fuel rods 114 are compatible with, and may replace, conventional fuel rods 14, both full length T and part length P, which shielding rods 114 may match in diameter, length, and/or outer cladding characteristics. Of course, in other fuel designs, shielding rods 114 may take on other shapes, sizes, alignments, densities, and connection points in order to preserve such compatibility across several other types of fuel and reactors.

Shielding fuel rods 114 reduce neutron flux of expected energies through absorption and/or scattering at their location within the example embodiment fuel assembly 110. Shielding fuel rods 114 may take on a variety of configurations based on the amount and type of flux-reducing effect desired. For example, shielding fuel rods 114 may be an empty zirconium cladding tube, that is, a fuel rod with no fuel pellets, or an empty stainless steel or other metal cladding tube. Or shielding fuel rod 114 may be a solid zirconium alloy, stainless steel, or other metal rod with no hollow interior or with dummy pellets of the chosen material inserted therein. These examples removing fuel elements and/or using higher absorption and/or thicker materials have a modest effect on neutron flux, with materials having higher cross-sections having greater reduction of flux and fluence over time.

Still further, shielding fuel rods 114 may include even higher cross-section materials, including fission poisons and other flux reducers like boron, gadolinium, cadmium, hafnium, etc., for greater flux reduction. Shielding fuel rods 114 may also include irradiation targets like cobalt-59 or iridium that produce desired isotopes as they absorb flux. For example, shielding fuel rods 114 may be segmented rods as disclosed in co-owned US Patent Publications 2007/0133731 to Fawcett et al., 2009/0122946 to Fawcett et al., 2009/0135983 to Russell, II et al., 2009/0135988 to Russell, II et al., 2009/0135990 to Fung Poon et al., and/or 2013/0077725 to Bloomquist et al., the disclosures of these publications being incorporated herein in their entireties. In the example of a segmented fuel rod for shielding fuel rods 114, axial variation in flux absorption and/or reflecting may be achieved by filling different axial segments with different materials having desired cross sections for a particular axial level. Shielding fuel rods 114 may thus reduce flux escaping beyond example embodiment fuel assembly 110 while producing desired isotopes for harvesting and/or having a burnable poison effect where flux reduction may vary through a single fuel cycle.

Although example embodiment fuel assembly 110 of FIG. 5 is illustrated with fluence control structures like shielding fuel rods 114, shielding channel 112, and/or plate curtain 120, it is understood that other and any fluence control structures are useable with example embodiment fuel assemblies. Additionally, fluence control structures can be used alone, in multiples, or in any combination, depending on the shielding needs at a core location where example embodiment fuel assemblies may be placed.

For example, in the example core of FIG. 4 with an outer ring of lower reactivity fuel assemblies to permit a flatter radial power profile while reducing neutron flux at core edges, an assembly at position 5-9 (column-row) may have only a single face exposed outside the core and be surrounded by lower-power assemblies. Such an example embodiment 5-9 fuel assembly may use only a single plate curtain 120 on the exposed face fabricated of stainless steel only 60 mils thick or use only a shielding channel 112 doped with a neutron absorber and satisfactorily reduce fluence to reactor structures adjacent to the 5-9 position. These example fluence control structures may be relatively simple to implement from a manufacturing and operational standpoint.

Or, for example, an example embodiment fuel assembly may be placed at a core position adjacent to a flux-sensitive component, such as a reactor core shroud that has been in use for decades and is nearing lifetime maximum fluence constraints. In such an example embodiment fuel assembly, multiple fluence control structures with high flux reduction capacity may be used together. For example, in a corner fuel assembly, a complete, outermost row and column of fuel rods may be shielding fuel rods 114 fabricated of solid stainless steel. In combination, a control-blade-arm type plate curtain 120 having very high neutron-absorption may be installed on exterior faces of the assembly nearest the shroud. This example fluence control structure combination may have very high flux-stopping capacity and shield the flux-sensitive component without the installation of separate reactor internal structures.

Of course, any number of other combinations of fluence control structures are useable in example embodiment fuel assemblies, based on fluence-limiting needs at any radial or axial position inside the reactor and operating concerns like manufacturing simplicity, fuel costs, reactor type, core makeup and neutronic response, isotope production needs, and core and fuel dimensions. A reactor engineer can forecast the core needs and flux response for a particular cycle and may choose and position example embodiment fuel assemblies accordingly for use in upcoming operations.

Example embodiments and methods thus being described, it will be appreciated by one skilled in the art that example embodiments may be varied and substituted through routine experimentation while still falling within the scope of the following claims. For example, a variety of different reactor and core designs are compatible with example embodiments and methods simply through proper dimensioning of example embodiments—and fall within the scope of the claims. Such variations are not to be regarded as departure from the scope of these claims.

What is claimed is:

1. A core for a nuclear reactor, the core including fissile material for generating power and having an edge beyond which no fissile material extends, wherein the core comprises:
   a plurality of nuclear fuel assemblies including the fissile material; and
   a fluence controlled nuclear fuel assembly at the edge of the core, wherein the fluence controlled nuclear fuel assembly includes the fissile material and a fluence control structure integrally within the fluence controlled nuclear fuel assembly only at the edge of the core, wherein the fluence control structure is fabricated of materials that reduce neutron flux so as to reduce neutron flux beyond the edge of the core, and wherein the plurality of nuclear fuel assemblies lack the fluence control structure and are a same configuration as, and interchangeable with, the fluence controlled nuclear fuel assembly in the core.

2. The core of claim 1, wherein the core is cylindrical, and wherein the edge is a radial perimeter of the cylindrical core.

3. The core of claim 1, wherein the fluence control structure nuclear fuel assembly is fabricated of materials that maintain their flux-reduction when exposed to radiation in the core when operating.

4. The core of claim 1, further comprising:
   a core shroud surrounding the nuclear fuel assemblies and the fluence controlled nuclear assembly, wherein the edge is directed toward the core shroud with no nuclear fuel assembly intervening.

5. The core of claim 3, wherein the fluence control structure consists essentially of a material having a thermal neutron absorption cross section of at least 2 barns.

6. The core of claim 5, wherein the material is an alloy containing iron, hafnium, cadmium, or combinations of any thereof.

7. The core of claim 1, wherein the fluence control structure is a member of the group including a shielding channel, a plate curtain, and a shielding fuel rod.

8. The core of claim 1, wherein the fluence controlled nuclear fuel assembly includes a plurality of nuclear fuel rods and a channel surrounding all fuel rods in the fluence controlled nuclear fuel assembly, and wherein the fluence controlled nuclear fuel assembly includes a plurality of the fluence control structures, including,     a shielding channel that is the channel surrounding all fuel rods in the fluence controlled nuclear fuel assembly,     a plate curtain attached to a face of the channel of the fluence controlled nuclear fuel assembly, and     a shielding fuel rod that is an unfueled, solid rod with no internal cavity, wherein the shielding fuel rod is aligned with the plurality of fuel rods and surrounded by the channel in the fluence controlled nuclear fuel assembly.

9. The core of claim 7, wherein the shielding fuel rod is a member of the group including a segmented rod housing a non-fuel irradiation target, an empty rod, and a solid rod having no internal cavity.

10. The core of claim 8, wherein the plurality of the fluence control structures consist essentially of non-burnable materials maintaining a thermal neutron absorption cross section of at least 2 barns following exposure to radiation in the core while operating.

\* \* \* \* \*